United States Patent [19]

Urmenyi et al.

[11] Patent Number: 4,501,504
[45] Date of Patent: Feb. 26, 1985

[54] NON-CONTACTING MEASUREMENT OF SURFACE TEMPERATURE

[76] Inventors: Laszlo Urmenyi, 40 Thackeray Ct., Hanger Vale La., London W5 3AT; William R. Urmenyi, 45 Lloyd Rd., Worcester Park, Surrey, both of England

[21] Appl. No.: 411,242

[22] Filed: Aug. 25, 1982

[51] Int. Cl.³ .................. G01K 1/16; G01K 13/04; G01K 17/08
[52] U.S. Cl. .................. 374/164; 219/328; 374/112; 374/120; 374/153; 374/11
[58] Field of Search ............... 374/101, 116, 135, 153, 374/164, 7, 112, 120; 219/328; 364/557

[56] References Cited

U.S. PATENT DOCUMENTS

| | | | |
|---|---|---|---|
| 2,264,968 | 12/1941 | De Forest | 374/7 |
| 2,627,182 | 2/1953 | Quereau et al. | 374/135 |
| 3,282,107 | 11/1966 | Ekstrom, Jr. | 374/153 X |
| 3,321,974 | 5/1967 | Sterbutzel | 374/164 |
| 3,618,386 | 11/1971 | Black | 374/115 |
| 3,691,840 | 9/1972 | Dufour et al. | 374/135 X |
| 3,926,053 | 12/1975 | Schurrer et al. | 374/153 X |
| 4,183,248 | 1/1980 | West | 374/164 |
| 4,191,052 | 3/1980 | Drzewiecki | 374/135 |

*Primary Examiner*—Daniel M. Yasich

[57] ABSTRACT

The purpose of the invention is to provide means for non-contacting sensing of the surface temperature of objects. A member, adapted to be brought in the vicinity of the object, has an opening leading to a protective enclosure in which a temperature sensing element is mounted. Pumping means are provided to suck the ambient fluid, usually air, from the surface of the object through the opening into the protective enclosure, whereby the temperature sensing element takes up the fluid temperature, providing a fluid temperature signal. A gap is formed between the object and the member and the fluid flows in this gap before entering the opening and takes up a temperature between the object temperature and the member temperature. A second temperature sensing element is adapted to take up the temperature of the member providing a member temperature signal. Electronic circuits are provided to combine the fluid temperature signal and member temperature signal in a manner to obtain an object temperature signal which is a function of the surface temperature of the object unaffected by the temperature of the member. A differentiator may be added which provides a signal which is a function of the rate of change of the fluid temperature and is combined with the fluid temperature signal and the member temperature signal in a manner to obtain an object temperature signal of reduced time constant.

11 Claims, 4 Drawing Figures

NON-CONTACTING MEASUREMENT OF SURFACE TEMPERATURE

This invention refers to the non-contacting measurement of the surface temperature of objects.

It has been suggested to measure the temperature of moving metal foil by mounting a temperature sensing element in a protective enclosure near the metal foil and using means to suck air from the foil surface into the enclosure, the temperature sensing element producing an electric signal which is a function of the temperature of the air entering the enclosure, which closely follows the foil temperature. The purpose of this proposed device was to apply the electric signal to an eddy current type foil thickness measuring device in a manner to compensate the influence of foil temperature variations on the foil thickness measurement. The proposed enclosure was part of an essentially plane member adapted to be mounted in the vicinity of and parallel to the moving metal foil so that the pumped air flows in the narrow gap between the foil and the said member. It was found that initially, when the said member is still cold, the air entering the enclosure does not quite reach the foil temperature but is cooled by the said member, the air temperature being essentially the arithmetic mean between foil temperature and member temperature. It was also found that when the foil temperature changed rapidly, there was some time delay till the temperature sensing element followed.

The object of the present invention is to provide non-contacting means to obtain an electric signal which is a function of the surface temperature of an object of any shape, free from the above mentioned disadvantages.

A further object of the invention is to provide means to obtain a temperature read-out in any convenient temperature scale from the above signal.

According to the invention, non-contacting means are provided to obtain an electric object temperature signal which is a function of the surface temperature of an object, comprising a first temperature sensing element mounted in a protective enclosure, a member adapted to be brought in the vicinity of the object, the shape of part of the surface of the said member being such that when it is in the operating position a gap is formed between the object and said member, said member having an opening leading to the said protective enclosure, pumping means adapted to suck the ambient fluid, usually air, from the surface of the object into the protective enclosure whereby the first temperature sensing element takes up the temperature of the inflowing fluid providing an electric fluid temperature signal, a second temperature sensing element adapted to sense the temperature of said member providing an electric member temperature signal, and means to combine the signals obtained from the two temperature sensing elements in a manner that the said electric temperature signal is obtained which is a function of the surface temperature of the object, unaffected by the temperature of the said member.

Also, according to the invention, means are provided to obtain a further electric signal which is a function of the rate of change of the fluid temperature signal, and means to combine the said further electric signal with the fluid temperature signal to obtain an object temperature signal of reduced time constant.

Also according to the invention means are provided to obtain from the object temperature signal a temperature read-out.

Also according to the invention, when greatest accuracy of measurement is required, electrical means may be provided to heat at least part of the member facing the object essentially to the temperature of the fluid sucked into the protective enclosure.

Alternatively, the member may be heated to a temperature which is preferably at least as high as the maximum temperature reached by the object and means are provided to keep the temperature of the member constant.

The object temperature signal may be utilised in various ways. E.g. it may be used in conjunction with an eddy-current type foil or sheet thickness measuring device to compensate for the effect of temperature variations of the foil or sheet on the measurement or in conjunction with any process where temperature variations are important. Actual temperature read-out is not always required. Alternatively it may be utilised to obtain a temperature read-out.

The invention will now be more fully described by way of examples with reference to the accompanying drawings in which FIG. 1 is an example of the invention applied to a plane object.

Figure 1:
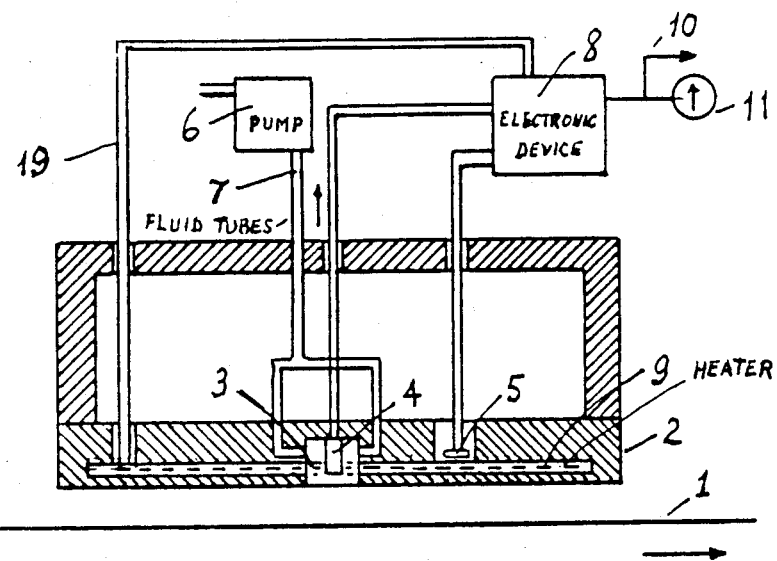
Figure 3:
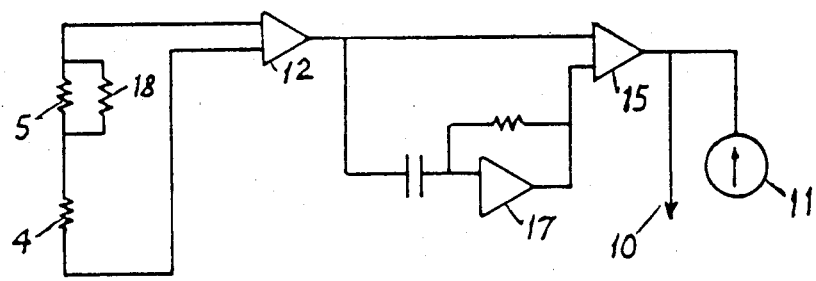
FIG. 3 is a block diagram of an example of the electronic circuit of the invention employing one resistance thermometer with positive and one thermistor with negative temperature co-efficient.
Figure 4:
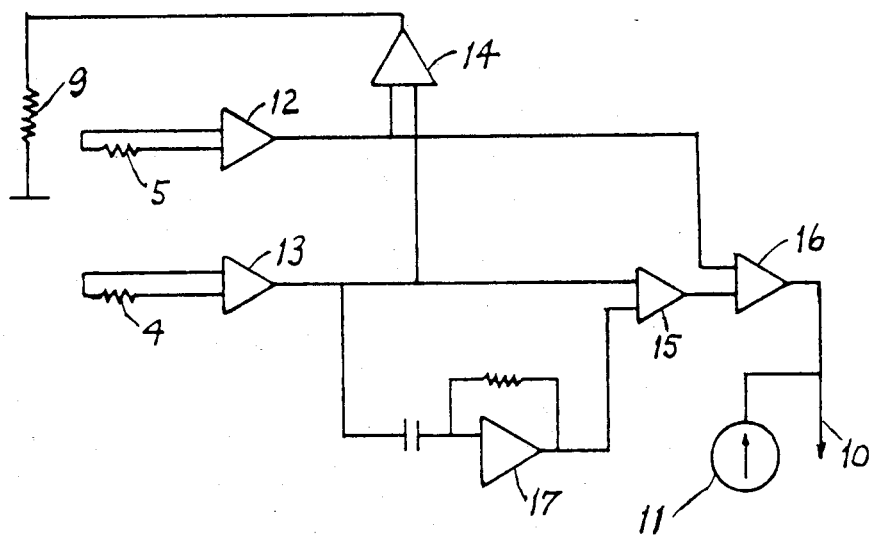
FIG. 4 is a block diagram of an example of the electric circuit of the invention employing two resistance thermometers both having positive or both having negative temperature co-efficients.

In FIG. 1, 1 is the object, e.g. aluminium foil, moving in the direction of the arrow, 2 is the member, 3 is the protective enclosure, 4 is the first temperature sensing element, e.g. a platinum wire thermometer, 5 is the second temperature sensing element, 6 is pumping means adapted to suck air from the surface of the object via tubing 7, 8 is an electronic device as shown in detail in FIG. 3 or FIG. 4, 9 is a heating element adapted to heat the surface of member 2 facing the object 1, 19 are leads carrying the current to 9, 10 is the output of 8 being the object temperature signal and 11 is means to provide the object temperature read-out.

Figure 2:
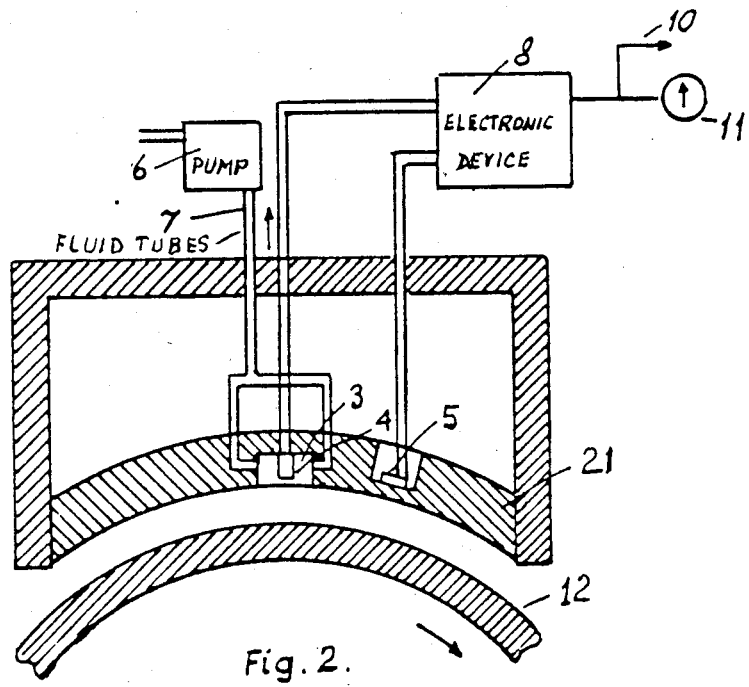
FIG. 2 is an example of the invention applied to a cylindrical object.

In this example the object is plane and so is the surface of the member facing the object, in the operating position the surface of the member being essentially parallel to the object. The surface of the member may be slightly curved, the distance between member and object being smaller near the centre than near the edge. The air flows in the latter case slower near the edge than near the centre. Heating element 9 is optional and is only used when greatest accuracy of measurement is essential. Temperature read-out 11 is also optional. In operation air flows in the gap between 1 and 2 and takes up a temperature between the temperature of 1 and 2. Sensor 4 takes up the temperature of the air and second sensor 5 takes up the temperature of the member. The electronic circuitry of 8 provides an output signal which is a function of the temperature of the object 1 unaffected by the temperature of member 2. Details of an example of the block diagram of the circuit are described with reference to FIGS. 3 and 4. In FIG. 2, 12 is part of the object, e.g. a cylindrical rotating shaft, 21 is the member, which has a cylindrical surface, which, when in the operating position, may be concentric with 12, or may be slightly eccentric, the distance being smaller near the centre. Numerals 3 to 11 denote identical parts to FIG. 1 and are self explanatory.

In FIG. 3, 4 is a resistance thermometer, e.g. platinum wire, having a positive temperature co-efficient, 5 is a thermistor having a negative temperature co-efficient 4 and 5 being connected in series, 18 is a resistor, 12 is a signal conditioning amplifier, 17 is a differentiator, 15 is a summing amplifier, 10 is the output, 11 is a temperature read-out device. This example is suitable when only limited accuracy is required.

The thermistor on its own has a non-linear characteristic, but with a resistor of suitable value connected parallel to the thermistor, an approximately linear characteristic can be obtained over a wide temperature range. In operation, the fluid temperature being essentially the arithmetic mean between object temperature and member temperature, when the fluid temperature and member temperature are equal, then the fluid temperature must be equal to the object temperature. But when the member temperature is lower than the fluid temperature, then the resistance of 5 is greater and the cooling effect of the member on the fluid is compensated. The output of 12 is therefore a linear function of the object temperature unaffected by the member temperature. The differentiator 17 produces an output proportional to the rate of change of the output of 12 and added to the output of 12 by means of summing amplifier 15 an output 10 of reduced time constant is obtained. 11 is a device giving a temperature read-out.

Referring now to FIG. 4, 4 is a temperature sensing element adapted to measure the temperature of the fluid, usually air, 5 is a temperature sensing element adapted to measure the temperature of the member, both temperature sensing elements having a positive temperature co-efficient, 12 and 13 are signal conditioning amplifiers, 14 is a difference amplifier also providing power for heating element 9, 15 is a summing amplifier, 16 is a difference amplifier, 17 is a differentiator. Heating element 9, difference amplifier 14 and differentiator 17 are optional. If 17 is not used, 15 becomes superfluous. 10 is the output and 11 the temperature read-out.

The operation of the circuit is best explained by the way of numerical example. Let us assume that the object temperature is 100° C. and the member temperature is 60° C. Then the fluid temperature will be 80° C. If the output of 13 is proportional to twice the fluid temperature, i.e. 160° C. and the output of 12 is proportional to the member temperature i.e. 60° C., then, disregarding summing amplifier 15, the inputs to difference amplifier 16 are proportional to 160° C. and 60° C. respectively, and the output of 16 is therefore proportional to 160−60=100° C. i.e. the object temperature, unaffected by the member temperature.

Differentiator 17 produces an output proportional to the rate of change of fluid temperature and is added to the output of 13 in order to reduce the time constant of the measurement.

When greatest accuracy is required, heating element 9 is provided which heats the member to fluid temperature and therefore, since the fluid temperature is the arithmetic mean between object temperature and member temperature, the fluid temperature becomes exactly equal to the object temperature. The difference amplifier 14 is adapted to provide an output which is a function of the difference between half the output of 13 and the output of 12, i.e. a function of the difference between the temperatures of the fluid and the member and provides power to the heating element 9 until the difference becomes zero.

We claim:

1. Method of non-contacting sensing of the surface temperature of an object consisting in bringing at least a part of the surface of a member, said part conforming generally in shape to the surface of the object, in close proximity to the surface of the object thereby forming a gap between the two surfaces, sucking up fluid, preferably air, from the gap into tube means and through a protective enclosure in the member, the fluid thus sucked up having acquired a temperature which is the arithmetic mean of the surface temperature of the object and the member, sensing the temperature of the sucked up fluid and the surface temperature of the member by using temperature sensing elements, utilising one of the temperature sensing elements to obtain an electrical signal which is a function of twice the temperature of the fluid and utilising the other temperature sensing element to obtain an electrical signal which is a function of the surface temperature of the member and combining the two signals so as to obtain a third signal which is a function of the difference between twice the temperature of the sucked up fluid and the temperature of the member, the said third signal being a measure of the surface temperature of the object.

2. Device for non-contacting sensing of the temperature of the surface of an object comprising a first temperature sensing element mounted in a protective enclosure, a member having a surface conforming generally in shape to the surface of the object, for disposition in close proximity of the surface of the object, thus forming a gap between the surfaces, the member having conduit means having an opening communicating with the gap facing the surface of the object and leading to the protective enclosure, pumping means to suck the ambient fluid, usually air, from the surface of the object into the protective enclosure whereby the first temperature sensing element takes up the temperature of the inflowing fluid providing a fluid temperature signal, a second temperature sensing element sensing the temperature of the member providing a member temperature signal and amplifying means which combines the fluid temperature signal and the member temperature signal to obtain an object temperature signal which is a function of the difference between twice the fluid temperature and the member temperature and thus a function of the surface temperature of the object.

3. Device as claimed in claim 2 in which the object temperature signal is a function of the difference between twice the temperature of the fluid and the temperature of the member.

4. Device as claimed in claim 3 in which one of the said temperature sensing elements, preferably the fluid temperature sensing element, has a positive temperature coefficient and the other temperature sensing element has a negative temperature coefficient, the two temperature sensing elements being connected in series, a signal conditioning amplifier and connecting means to connect the temperature sensing elements to the input of the signal conditioning amplifier.

5. Device as claimed in claim 4 comprising also differentiating means to obtain a further electrical signal which is a function of the rate of change of the output of said signal conditioning amplifier and summing means to combine the said further electrical signal and the output of the signal conditioning amplifier to obtain an object temperature signal of reduced time constant.

6. Device as claimed in claim 3, comprising also electric heating means to heat at least that part of the member which is in the vicinity of the object, and means adapted to control the power supplied to the heating means such that the member temperature is kept equal to the fluid temperature.

7. Device as claimed in claim 3 comprising also means adapted to read-out the object temperature.

8. Device as claimed in claim 1 or 3 in which the object temperature signal is applied to an eddy current type thickness measuring device in a manner to compensate for the effect of object temperature variations on the thickness measurement.

9. Device as claimed in claim 3 in which both said temperature sensing elements have temperature coefficients of the same sign, preferably both positive, comprising at least one signal conditioning amplifier, connecting means to connect the said temperature sensing elements at least to one of said signal conditioning amplifiers providing an output which is a function of the difference between twice the temperature of the fluid and the temperature of the member.

10. Device as claimed in claim 9, comprising a first signal conditioning amplifier, connecting means to connect one of the said temperature sensing elements to the first signal conditioning amplifier, a second signal conditioning amplifier, connecting means to connect the other temperature sensing element to the second signal conditioning amplifier, the said first signal conditioning amplifier having an output essentially proportional to twice the fluid temperature and the second signal conditioning amplifier having an output essentially proportional to the member temperature.

11. Device as claimed in claim 10 comprising also a differentiator to obtain a further electric signal which is a function of the rate of change of the fluid temperature signal a summing amplifier to combine the said further electric signal with the fluid temperature signal and a difference amplifier to combine the output of the summing amplifier and the member temperature signal to obtain an object temperature signal of reduced time constant.

* * * * *